United States Patent [19]
Budenholzer

[11] 3,881,548
[45] May 6, 1975

[54] MULTI-TEMPERATURE CIRCULATING WATER SYSTEM FOR A STEAM TURBINE
[75] Inventor: Robert J. Budenholzer, Oakland, Pa.
[73] Assignee: Westinghouse Electric Corporation, Pittsburgh, Pa.
[22] Filed: July 14, 1971
[21] Appl. No.: 162,364

[52] U.S. Cl. .................. 165/110; 165/122; 60/693; 60/690; 261/DIG. 11
[51] Int. Cl. .............................................. F28b 1/02
[58] Field of Search ........... 165/107, 110, 111, 113, 165/122, 124; 60/95, 96, 690–693, 685; 261/DIG. 11

[56] References Cited
UNITED STATES PATENTS
3,423,078  1/1969  May ............................... 165/113 X
3,635,042  1/1972  Spangemacher ................ 165/113 X
3,831,667  8/1974  Kilgore ............................... 165/110

OTHER PUBLICATIONS
Rossie, J. P. et al., Dry–Type Cooling Towers Environment Protection Agency, Water Pollution Control Research Series (16130EES 11/70), 11/1970, Part 1, pgs. 13 to 20 (TJ563.R6).

Primary Examiner—Albert W. Davis, Jr.
Attorney, Agent, or Firm—F. J. Baehr, Jr.

[57] ABSTRACT

A condensing system utilizing a multi-stage cooling tower to provide multi-temperature circulating water for one or more condensers to permit greater heat transfer in the cooling tower and efficient condensation of exhaust steam from one or more turbines.

2 Claims, 3 Drawing Figures

MULTI-TEMPERATURE CIRCULATING WATER SYSTEM FOR A STEAM TURBINE

BACKGROUND OF THE INVENTION

This invention relates to a condensing system for one or more turbines and more particularly to a condensing system providing multi-temperature circulating water for one or more condensers.

Heat from the exhaust steam of steam turbogenerator platns has typically been transferred to cooling water pump from a river, lake or other natural water supply. However, as power plants increase in size and number, the availability of suitable natural sources of cooling water has decreased, necessitating the use of wet or dry cooling towers. Summer ambient air temperature normally limits the mean temperature difference of the cooling system and the amount of heat which can be effectively removed from the cooling water utilizing air as the cooling medium. By increasing the mean temperature difference between the air and the cooling water, cooling towers can remove a greater quantity of heat and become more economical to operate and construct.

SUMMARY OF THE INVENTION

In general, a condensing system for exhaust steam from a turbine made in accordance with this invention comprises a condenser adapted to condense steam by transferring heat to a liquid coolant, the condenser having two separate portions, each portion being associated with a separate liquid coolant, one portion being disposed to be supplied with higher temperature liquid coolant than another portion thereof, and a cooling tower utilizing air as a cooling medium, the cooling tower having separate passes for the liquid coolant associated with each portion of the condenser, and the passes being sequentially arranged to allow series air flow therethrough.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
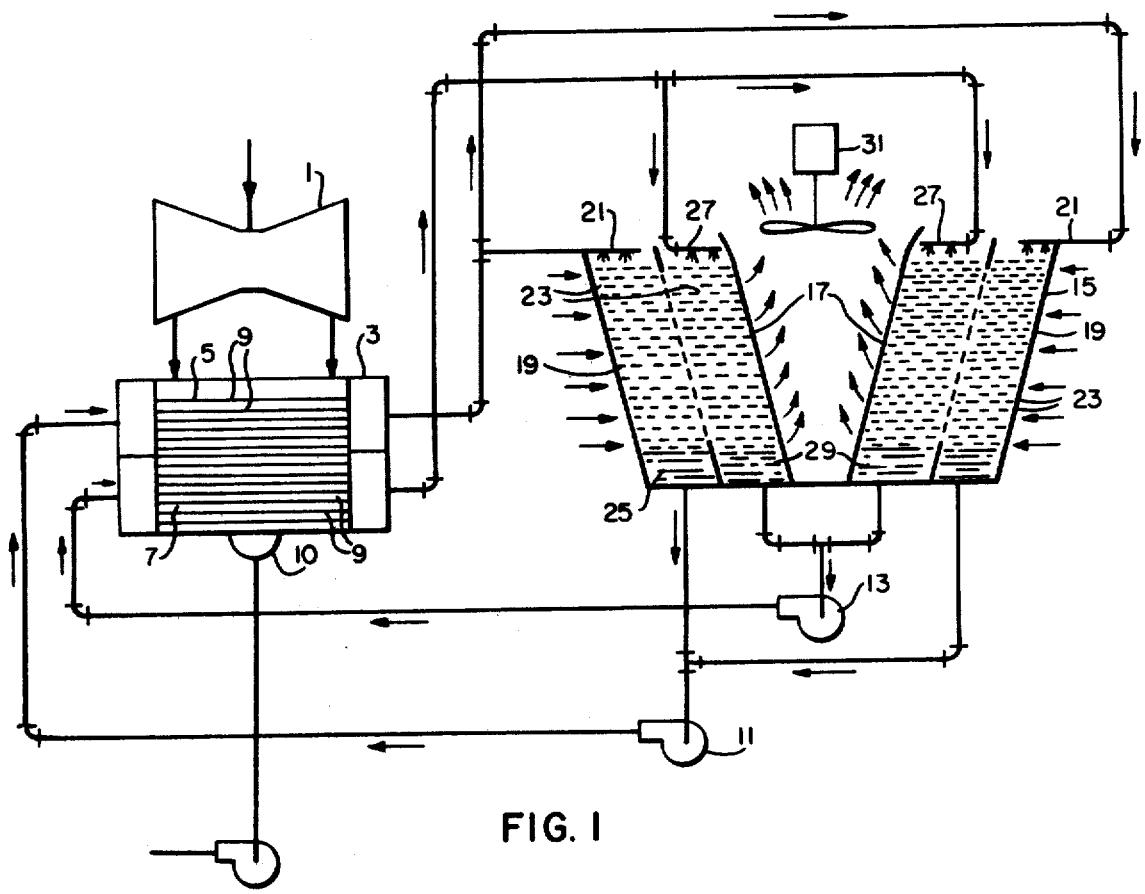
FIG. 1 is a schematic diagram of a condensing system made in accordance with this invention.

Referring now to the drawings in detail, FIG. 1 schematically shows a condensing system made in accordance with this invention. Steam enters a double flow low pressure portion of a steam turbine 1 and flows to a heat exchanger or condenser 3 having two separate heat exchange portions, an upper portion 5 and a lower portion 7. Each heat exchange portion 5 and 7 comprises a plurality of tubes 9 extending therethrough. The tubes 9 are so arranged with respect to from the condenser 3 that liquid coolant, generally water, hereinafter referred to as circulating water, flows through the tubes. The exhaust steam from the turbine 1 passes over the outside of the tubes 9 giving up its heat of vaporization and condenses. The condensate is collected in a hot well 10 and is then pumped through a feed water system to a boiler (neither of which are shown).

The circulating another is pumped through the heat exchange portions 5 and 7 of the condenser 3 by the circulating water pumps 11 and 13, respectively, and through a wet cooling tower 15.

The cooling tower 15 has separate stages or passes 17 and 19 for the circulating water from each heat exchange portion 5 and 7 of the condenser 3. Circulating water from one portion, the upper heat exchange portion 5, of the condenser 3 is pumped to distributor headers 21 which distribute water over the outer passes 19 of the cooling tower 15. The outer passes 19 are disposed adjacent the air inlet to the cooling tower. The circulating water flows downwardly from the distributor headers 21, flowing over packing 23 which increases the surface area of the circulating water to improve the heat transferred by conduction and evaporation, and then downwardly to a collecting pan 25 at the base of the cooling tower 15.

Circulating water from the other portion, the lower heat exchanger portion 7, of the condenser is pumped to distributor headers 27 which distribute the circulating water over the inner passes 17 of the cooling tower 15. The circulating water then flows downwardly through packing 23 to increase its surface area, thus increasing the heat transferred by conduction and evaporation and then collects in the collecting-pans 29 at the base of the cooling tower 15.

An induced draft fan 31 draws air through the stages 17 and 19 providing series air flow therethrough. The condenser and cooling tower are, thus cooperatively associated to produce a multi-temperature circulating water system, wherein the circulating water entering the upper portion 5 of the condenser 3 is cooler than the circulating water entering the lower portion 7 of the condenser 3, and the circulating water leaving the upper portion 5 of the condenser 3 is cooler than circulating water leaving the lower portion 7 of the condenser. Summarizing the above, the cooler circulating water is fed to the inlet stage 19 of the cooling tower 15 where it contacts the cool inlet air, while the warmer circulating water passes through the outlet stage 17 of the cooling tower 15 and is brought in contact with air that has been heated by the inlet stage 17. Thus, the air passing through the cooling tower is subjected to a higher mean temperature difference than air in conventional cooling towers having a single stage or pass. Each stage or pass is generally kept separate so that the circulating water from each stage is cooled to a different temperature. Having warmer circulating water flowing through the tool; portion 7 of the condenser adjacent the hot well 10, wherein the condensate is collected, prevents subcooling of the condensate, which would lower the efficiency of the cycle.

To obtain the most efficient system, the size of the condenser, the circulating water flow rates through each portion of the condenser and the heat transfer area allotted to each stage of the cooling tower must be economically optimized.

Figure 2:
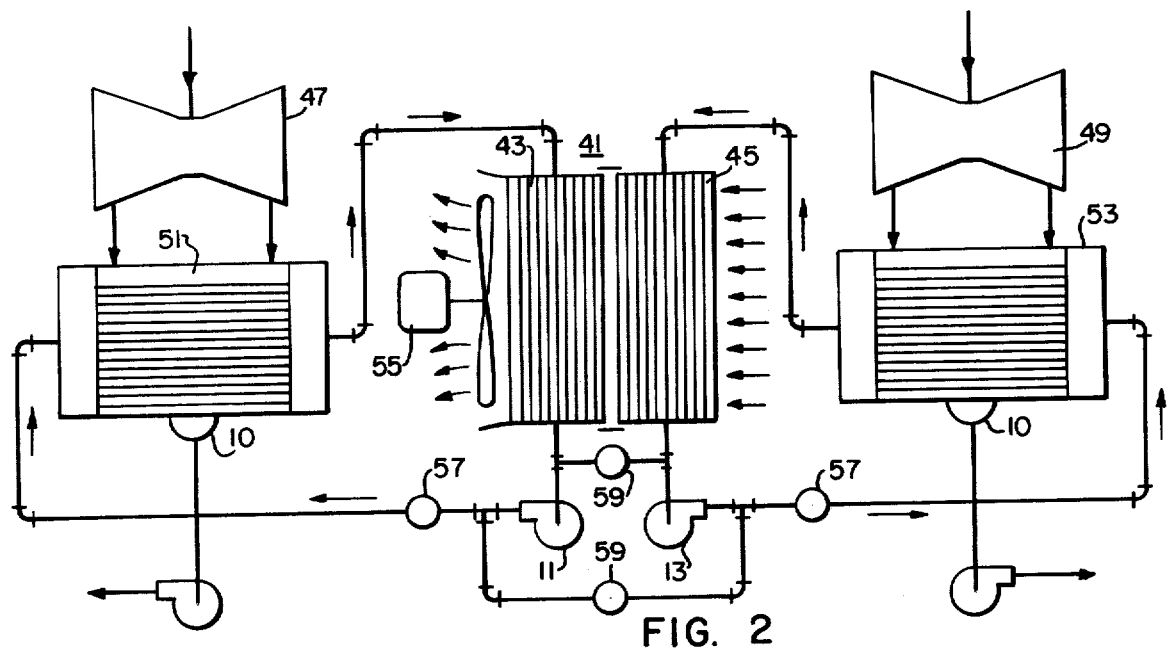
FIG. 2 is a schematic diagram of another embodiment of the condensing system.

FIG. 2 shows a schematic diagram of a similar system incorporating a dry cooling tower 41 having two stages 43 and 45 disposed in series to provide circulating water for a multi-temperature condensing system in which double flow low pressure portions forming the exhaust portions of one or more turbines 47 and 49 operate at different back pressures, since the condensers 51 and 53 are supplied with circulating water cooled to different temperatures. An induced draft fan 55 is shown drawing air over the passes or stages 43 and 45 of the cooling tower 41. While the schematic diagram shows an induced draft fan, natural draft could be utilized to move the air across the tower.

During cold weather operation, the temperature of the cooler portion of the system, the one on the right in FIG. 2, may drop to a value, which will lower the pressure in the condenser 53, beyond the choking or critical pressure drop for the last row of blades of the turbine 49, that is the pressure below which additional pressure drop will not increase the work done by the turbine. Thus, after the choking of critical pressure is reached, lowering the temperature, which lowers the pressure or increases the vacuum, will not increase the amount of work done by the turbine, but will cause subcooling of the condensate leaving the condenser, which requires additional heating of the feed water before it enters the boiler, thus reducing the efficiency of the system. By properly locating control and by-pass valves 57 and 59, respectively, the circulating water streams from each stage of the cooling tower may be mixed by adding cooler circulating water to the warm stream or vice versa to eliminate choking. This may also reduce the temperature in the warmer condenser, increasing its efficiency.

Figure 3:
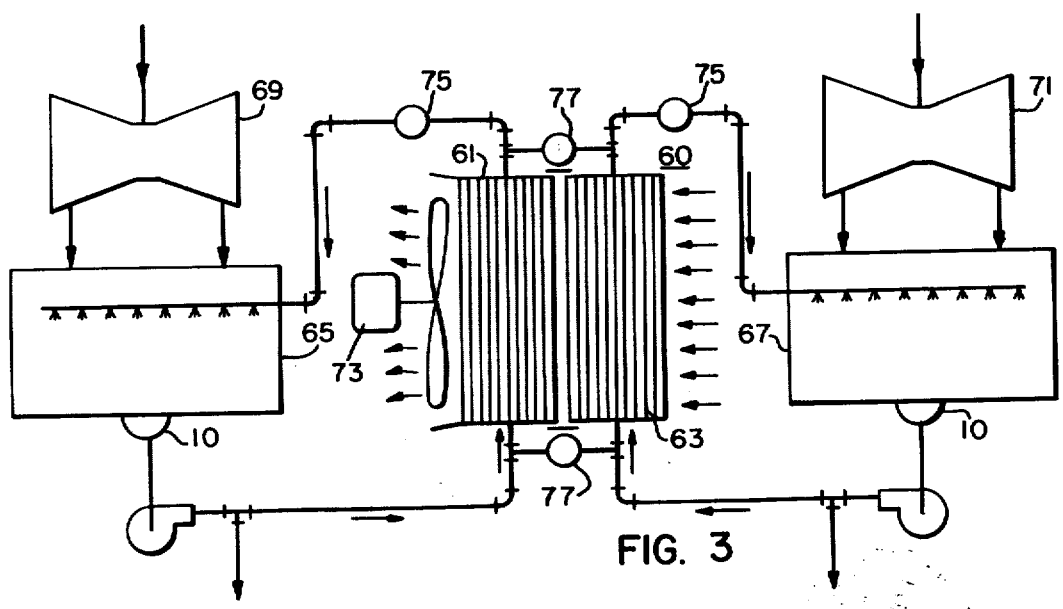
FIG. 3 is a schematic diagram of a modification of the condensing system shown in FIG. 2.

The schematic diagram shown in FIG. 3 shows a dry cooling tower 60 having two passes or stages 61 and 63 so disposed to provide series air flow across the stages to produce a multi-temperature circulating water system for two direct contact condensers 65 and 67, which condense exhaust steam from two double flow low pressure portions 69 and 71 forming the exhaust portions of one or more turbines. FIG. 3 also shows an induced draft fan 73 for drawing air across the stages 61 and 63 of the cooling tower and control by-pass valves 75 and 77, respectively, for diverting cold circulating water to the warmer circulating water stream or vice versa in winter months to prevent choking of the turbine 71 associated with the cooler portion of the condensing system, the portion on the right as shown in FIG. 3. As hereinbefore noted, proper mixing of the circulating water in the winter months prevents subcooling of the condensate in the cooler portion of the system and additional cooling in the warmer portion of the system resulting in an increase in efficiency of the total system.

These systems are generally arranged to provide multiple temperature circulating water streams to and from the condensers with the condensers and cooling towers being so arranged with respect to each other that entering air contacts the cooler circulating water and the warmer air contacts the warmer circulating water allowing a greater amount of heat to be transferred to the air to produce a cooling system which is capable of economically utilizing air as a heat sink.

What is claimed is:

1. A condensing system for condensing steam comprising a condenser having a first heat exchanger through which a circulating fluid flows and being disposed so as to be contacted by influent steam entering said condenser and a second heat exchanger through which a circulating fluid flows, a cooling tower having an upstream and a downstream heat exchange portion disposed to provide series air flow therethrough, said upstream heat exchange portion being contacted by influent air, said first heat exchanger being in fluid communication with said upstream heat exchange portion of the cooling tower and said second heat exchanger being in fluid communication with the downstream heat exchange portion of said cooling tower, whereby the influent steam entering the condenser comes in contact with the heat exchanger portion of the condenser having the coolest circulating fluid to provide efficient condensing without subcooling.

2. The condensing system as set forth in claim 1, wherein the upstream and downstream heat exchange portion of the cooling tower form separate stages of a wet cooling tower.

* * * * *